United States Patent [19]

Olson et al.

[11] Patent Number: 4,533,710

[45] Date of Patent: Aug. 6, 1985

[54] 1,2-ALKANEDIOL DIACRYLATE MONOMERS AND POLYMERS THEREOF USEFUL AS CAPACITOR DIELECTRICS

[75] Inventors: Daniel R. Olson, Schnectady; Timothy W. O'Donnell, Albany, both of N.Y.

[73] Assignee: General Electric Company, Schenectady, N.Y.

[21] Appl. No.: 562,893

[22] Filed: Dec. 19, 1983

[51] Int. Cl.$^3$ .................. C07C 69/54; C08F 20/20; C08F 120/20; H01B 3/42
[52] U.S. Cl. .................. 526/323.2; 252/182; 252/579; 526/323.1; 560/224
[58] Field of Search .................. 252/182, 579; 526/323.1, 323.2; 560/224

[56] References Cited

U.S. PATENT DOCUMENTS

| 3,442,934 | 5/1969 | Pine | 560/224 |
| 4,243,818 | 1/1981 | Rogier | 560/224 |
| 4,410,644 | 10/1983 | Bunyan | 526/323.1 |

FOREIGN PATENT DOCUMENTS

| 1572843 | 6/1969 | France . |
| 53-10648 | 1/1978 | Japan . |

*Primary Examiner*—Paul Lieberman
*Assistant Examiner*—Robert A. Wax
*Attorney, Agent, or Firm*—William H. Pittman; James C. Davis, Jr.; James Magee, Jr.

[57] ABSTRACT

Compositions comprising 1,2-alkanediol diacrylate monomers may be polymerized to form polymers useful as dielectrics for capacitors. Said dielectrics are characterized by low dissipation factor and low capacitance change over a wide range of temperatures.

4 Claims, No Drawings

1,2-ALKANEDIOL DIACRYLATE MONOMERS AND POLYMERS THEREOF USEFUL AS CAPACITOR DIELECTRICS

This invention relates to new monomeric compositions of matter and polymers thereof, said polymers being useful for a number of purposes including the formulation of dielectrics. In their broadest definition, the monomers of this invention are 1,2-alkanediol diacrylates having the formula,

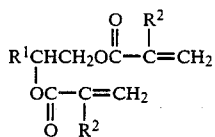

wherein $R^1$ is an alkyl radical having about 8-28 carbon atoms and $R^2$ is hydrogen or methyl.

Capacitors are used in a wide variety of electrical circuits, for example in relatively high voltage AC power systems (such as the common 110-volt systems) and in relatively low voltage (e.g., under 50 volts) DC systems frequently encountered in printed circuits and the like. Important factors which must be considered in the manufacture of such capacitors are efficiency, temperature of operation, dissipation factor and behavior upon failure.

Efficiency is normally measured in terms of capacitance per unit volume. High efficiency is desirable, with values of at least 50 microfarads per cubic inch being preferred. Operating temperature and dissipation factor are related since many capacitors, especially operating at relatively high temperatures, function inadequately because they dissipate their electrical energy as heat. Moreover, many capacitor uses, especially in DC circuits, require relatively small changes in capacitance over a wide temperature range.

Finally, the behavior of a capacitor upon failure may be a critical factor in the operation of the circuit in which the capacitor is used. Upon failure of a ceramic capacitor, for example, the circuit is not broken and surges in voltage and/or current may caused damage to other components therein. It is desirable that breakage of the circuit occur when a capacitor fails, thereby preventing such damage.

In copending, commonly assigned application Ser. Nos. 562,779, filed Dec. 19, 1983, now abandoned and 620,647, filed June 14, 1984, there is disclosed a novel capacitor structure having particularly advantageous properties with respect to these and other criteria. This structure comprises successive conductive layers which are offset so as to define a central capacitance region of stacked isolated extending layers, a coating of dielectric deposited on each said layers so that the layers in the capacitance region are substantially spaced and separated by said coating of dielectric, the deposition of said coating being controlled so as to slope toward cutoff lines spaced substantially from two separated portions of the central capacitor region, said conductive layers extending beyond said cutoff lines so that successive layers fuse into spaced apart terminal portions, and said cutoff line spacing being sufficient to cause the uppermost dielectric coating of the capacitor to have a horizontal dimension from the capacitor region to the terminal portion to accept a final layer deposition. Most often, said capacitors contain at least 100 dielectric-coated electrode layers. Copending, commonly assigned application Ser. No. 562,873, filed Dec. 19, 1983, now U.S. Pat. No. 4,499,520, discloses a wide variety of polyfunctional acrylate polymers useful as dielectrics in these and other capacitors. The disclosures of both of the aforementioned applications are incorporated by reference herein.

A principal object of the present invention is to provide novel polyfunctional acrylate monomers and polymers thereof.

A further object is to provide polyfunctional acrylates which, upon polymerization, yield materials suitable for use as dielectrics.

Another object is to provide polymeric dielectric materials useful in thin film capacitors.

Still another object is to provide monomers which are easy to deposit as thin films, said films being subsequently polymerizable by irradiation or the like to form layers useful as dielectrics in thin film capacitors.

Other objects will in part be obvious and will in part appear hereinafter.

As will be apparent from the above formula, the monomers of this invention comprise diacrylates and methylacrylates, preferably acrylates, derived from at least one dihydroxy compound of the formula

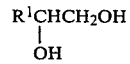

The $R^1$ value is an alkyl radical containing about 8-28 carbon atoms; examples are 1-octyl, 2-methylheptyl, 1-nonyl, 2,3-dimethylheptyl, 1-decyl, 2-dodecyl, 1-tetradecyl, 1-octadecyl, 1-eicosyl and 1-docosyl. Radicals having the formula $R^3CH_2$, wherein $R^3$ is an alkyl and especially a straight-chain alkyl radical having about 7-27 and most often about 9-17 carbon atoms, are preferred as $R^1$.

The 1,2-alkandiol diacylates may be easily prepared by esterification of 1,2-alkanediols or the corresponding epoxides with acrylic or methacrylic acid using known reaction procedures. Thus, the acid and diol may typically be reacted in a suitable solvent, in the presence of a small amount of an acidic esterification catalyst such as sulfuric acid, p-toluenesulfonic acid, acidic ion exchange resins or acidified clays. Ordinarily, a stoichiometric excess of the acid is used, the ratio of equivalents of acid to diol typically being between about 2:1 and about 4:1. The reaction is ordinarily carried out at about 100°-200° C., most often about 100°-150° C. It is often preferred to incorporate in the esterification mixture a minor amount of a polymerization inhibitor such as p-methoxyphenol, 2,6-di-t-butylphenol or 2,4,6-tri-t-butylphenol. The acrylic or methacrylic acid may be replaced by a functional derivative thereof such as an acyl halide, lower alkyl ester or amide, with suitable modification of the reaction conditions.

The preparation of the 1,2-alkanediol diacrylates of this invention is illustrated by the following example.

EXAMPLE 1

A solution of 51 grams (0.20 mole) of 1,2-hexadecanediol, 100 ml. (1.5 moles) of acrylic acid, 1.5 grams of p-toluenesulfonic acid and 2 grams of p-methoxyphenol in 400 grams of toluene was heated for about 24 hours under reflux as water was removed by azeotropic distillation. The solution was cooled, filtered and washed several times with dilute potassium carbonate solution and once with dilute sodium chloride solution. It was then dried and the solvent was evaporated to afford the desired diacrylate as a liquid.

The 1,2-alkanediol diacrylates of this invention may be polymerized under free-radical conditions, either alone or in the presence of other monomers. The term "polymer," as used herein, includes addition homopolymers and copolymers with one or more other monomers.

Polymerization by the free-radical method may be effected in bulk, solution, suspension or emulsion, by contacting the monomer or monomers with a polymerization initiator either in the absence or presence of a diluent at a temperature of about 0°–200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation.

A large variety of polymerizable compounds can be used to form copolymers with 1,2-alkanediol diacrylates of this invention. The include the following:

1. Unsaturated alcohols and esters thereof: Allyl, methallyl, crotyl, 1-chloroallyl, 2-chloroallyl, cinnamyl, vinyl, methylvinyl, 1-phenallyl and butenyl alcohols, and esters of such alcohols with saturated acids such as acetic, propionic, butyric, valeric, caproic and stearic; with unsaturated acids such as acrylic, α-substituted acrylic (including alkylacrylic, e.g., methacrylic, ethylacrylic propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxyic and aconitic; and with aromatic acids, e.g., benzoic, phenylacetic, phthalic, terephthalic and benzoylphthalic acids.

2. Unsaturated acids (examples of which appear above) and esters thereof with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

3. Unsaturated lower polyhydric alcohols, e.g., butenediol, and esters thereof with saturated and unsaturated aliphatic and aromatic, monobasic and polybasic acids, examples of which appear above.

4. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

5. Vinyl cyclic compounds including sytrene, o-, m-, p-chlorostyrenes, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpridine, vinylbenzofuran, N-vinylcarbazole; N-vinylpyrrolidone and N-vinyloxazolidone.

6. Unsaturated ethers such as methyl vinyl ether, ethyl vinyl ether, cyclohexyl vinyl ether, octyl vinyl ether, diallyl ether, ethyl methallyl ether and allyl ethyl ether.

7. Unsaturated ketones, e.g., methyl vinyl ketone and ethyl vinyl ketone.

8. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymetholated diacetone acrylamide and 2-acrylamido-2-methylpropanesulfonic acid.

9. Unsaturated aliphatic hydrocarbons, for instance, ethylene, propylene, butenes, butadiene, isoprene, 2-chlorobutadiene and α-olefins in general.

10. Unsaturated alkyl halides, e.g., vinyl fluoride, vinyl chloride, vinyl bromide, vinylidene chloride, vinylidene bromide, allyl chloride and allyl bromide.

11. Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.

12. Unsaturated acid halides such as cinnamyl acrylyl, methacrylyl, crotonyl, oleyl and fumaryl chlorides or bromides.

13. Unsaturated nitriles, e.g., acrylonitrile, methacrylonitrile and other substituted acrylonitriles.

By virtue of their polyfunctionality, the monomers of this invention form crosslinked polymers. Thus, they are adapted to the production of heat-resistant polymeric films.

The polymers of this invention are useful, for example, in the preparation of corrosion-resistant coatings and as ingredients for printing inks. They are also useful as insulating materials in certain electrical applications; for example, as potting compositions and as encapsulation resins.

A principal utility of the polymers of this invention, as previously mentioned, is as dielectric compositions in capacitors. The polymers are very useful in this respect because of their adaptability to the production of capacitors with high efficiency and with low dissipation factors. Such capacitors are disclosed and claimed in copending, commonly assigned application Ser. No. 562,871, filed Dec. 19, 1983, now U.S. Pat. No. 4,490,774.

The electrodes in the capacitors may be formed of materials and in configurations known in the art. Typical conductive materials are aluminum, copper, zinc, tin, stainless steel and alloys thereof, with aluminum being preferred.

A preferred subgenus of the polymers of this invention from the standpoint of use as dielectric members for capacitors consists of homopolymers of the 1,2-alkanediol diacrylates. Also contemplated are copolymers of said 1,2-alkanediol diacrylates with other mono- and polyacrylates. Illustrative of suitable monoacrylates are those of higher monohydroxy alcohols such as isodecyl alcohol or of higher monoepoxides, the term "higher" denoting at least 8 carbon atoms. The preferred copolymers, however, are those with other polyfunctional acrylates illustrated by those of such compounds as trimethylolpropane, neopentyl glycol, polybutadiene-derived polyols and polyepoxides. The copolymers are typically prepared from blends comprising about 25–75% by weight of the 1,2-alkanediol diacrylates of this invention, with the balance being other acrylates.

Capacitors containing the polymers of this invention as dielectrics have particularly advantageous properties, including high efficiency and low dissipation factors, when their configuration is as disclosed and claimed in the above-identified applications Ser. Nos. 562,779 and 620,647. Capacitors of this type may be produced by depositing alternating electrode and dielectric layers so as to provide alternate electrode layers with portions projecting from the stack and contacting each other in electrically connected relation.

The particular suitability of the polymers of this invention as capacitor dielectrics is illustrated by the following example.

EXAMPLE 2

A prototype capacitor was produced by drawing down a layer of 1,2-hexadecanediol diacrylate on an aluminum foil substrate, polymerizing said layer by contact with a 10-megarad electron beam, and depositing a metallic aluminum layer thereon. The thickness of the aluminum foil electrode was 12.5 microns, that of the dielectric layer was 3–6 microns and that of the deposited aluminum electrode was 300–500 Angstroms (0.03–0.05 micron). The area of the prototype capacitor was about 1 square inch. The dissipation factor of the test capacitor measured at 60 Hz. using an AC bridge, varied from 0.8 at 30° C. to 0.45 at 110° C. and 0.6 at 150° C. The change in capacitance, using the value at 30° C. as a baseline, varied from +1.2% at 80° C. to −0.8% at 150° C.

As will be apparent from these results, capacitors containing the polymers of this invention as dielectrics are characterized by versatility of application, typically including extremely low dissipation factors at both high and low temperatures and low capacitance change over a wide range of temperatures.

What is claimed is:

1. 1,2-Hexadecanediol diacrylate.
2. An addition polymer of the diacrylate of claim 1.
3. A polymer according to claim 2 which is a homopolymer or a copolymer with at least one of acrylates of higher monohydroxy alcohols, higher monoepoxides, polyols and polyepoxides.
4. A polymer according to claim 3 which is a homopolymer.

* * * * *